Feb. 18, 1958 A. L. C. HEITOR 2,823,857
MECHANICAL DEAD RECKONING AND TIME-DISTANCE
NAVIGATIONAL COMPUTER
Filed June 4, 1956 2 Sheets-Sheet 2

INVENTOR
ANTONIO L. C. HEITOR
BY Kenmon + Palmer
ATTORNEY

United States Patent Office 2,823,857
Patented Feb. 18, 1958

2,823,857

MECHANICAL DEAD RECKONING AND TIME-DISTANCE NAVIGATIONAL COMPUTER

Antonio Luis Chamiço Heitor, Lisbon, Portugal, assignor to George Dale Dunlap, Annapolis, Md.

Application June 4, 1956, Serial No. 589,066

Claims priority, application Portugal November 19, 1955

9 Claims. (Cl. 235—61)

This invention relates to a computer of the type commonly employed in the practice of dead reckoning navigation, and more particularly to a navigational computer for solving problems involving the determination of speed, time, distance, direction, drift, wind velocity and direction, true course, true heading, and the like.

There is a somewhat similar device that is well known in the navigational computer art as the Dalton dead reckoning computer. Such a device is shown in Dalton Patent 2,097,116, dated October 26, 1937. The Dalton computer consists of a frame having a translucent plotting disc which can be rotated within the frame. The plotting disc is surrounded by a compass rose which is attached to and rotates with the disc. At the center of the plotting disc is a small reference circle called a grommet. A slide which can be moved through the frame has polar coordinates imprinted thereon for representing speed and track. To solve problems of speed, drift, wind velocity and direction with this device, the translucent disc must be first marked upon and then rotated. A separate circular slide rule of conventional type may be attached to the back of the frame, to solve speed, time, and distance problems. The frame must be turned over, however, and the slide rule must be set separately when using a computer of this type.

The objects of this invention are as follows:

(1) To improve navigational computers of the Dalton type by eliminating the necessity of marking or plotting on the computer disc, by reducing the number of settings required for the solution of a problem and further by incorporating in the device a slide rule which will be automatically set for solving time and distance problems.

(2) To provide a simple, accurate, hand-held device for solving problems of dead reckoning navigation rapidly by two settings of computer components and without the use of a pencil or paper, and without marking or plotting on the device.

(3) To provide a device for solving wind triangle problems common to air navigation by the use of two complete circles or compass roses graduated from 0° to 360° which, when course is set on one compass rose opposite wind direction on the other, will automatically and correctly place the wind vector in relation to the course and ground speed vector which is represented by the center line of a movable slide, and the heading and air speed vector will be represented by a radial drift line on the movable slide. Alternatively, if heading is set on one compass rose opposite wind direction on the other, the wind vector will be correctly positioned in relation to the heading and air speed vector represented by the center line on the slide. The course and ground speed vector will then be represented by a radial drift line on the slide.

(4) To provide a computer for solving wind triangle problems having two compass roses and a movable slide which will completely solve the problem by making only one movement of the movable compass rose and one movement of the movable slide.

(5) To provide a radial scale on a translucent center piece of a movable compass rose to avoid the necessity of plotting or drawing the given wind velocity on the translucent surface.

(6) To incorporate into the computer a slide rule for solving speed, time and distance problems and to automatically set this slide rule of a scale setting of distance opposite a unit of time which is equal to the ground speed obtained in solving the wind triangle without making any additional movement, setting, or adjustment.

(7) To provide means interconnecting the time-distance slide rule with the slide in such a manner that the speed shown under the grommet is always equal to a scale setting of the same value of distance as the speed opposite a unit of time on the slide rule.

(8) To arrange the slide rule so that it may be read from the same side of the computer that is used for solving the wind triangle problem.

Other objects, features, and advantages of the invention will be readily apparent to those skilled in the art from the following specification and accompanying drawings illustrating a preferred embodiment, wherein.

Figure 1:
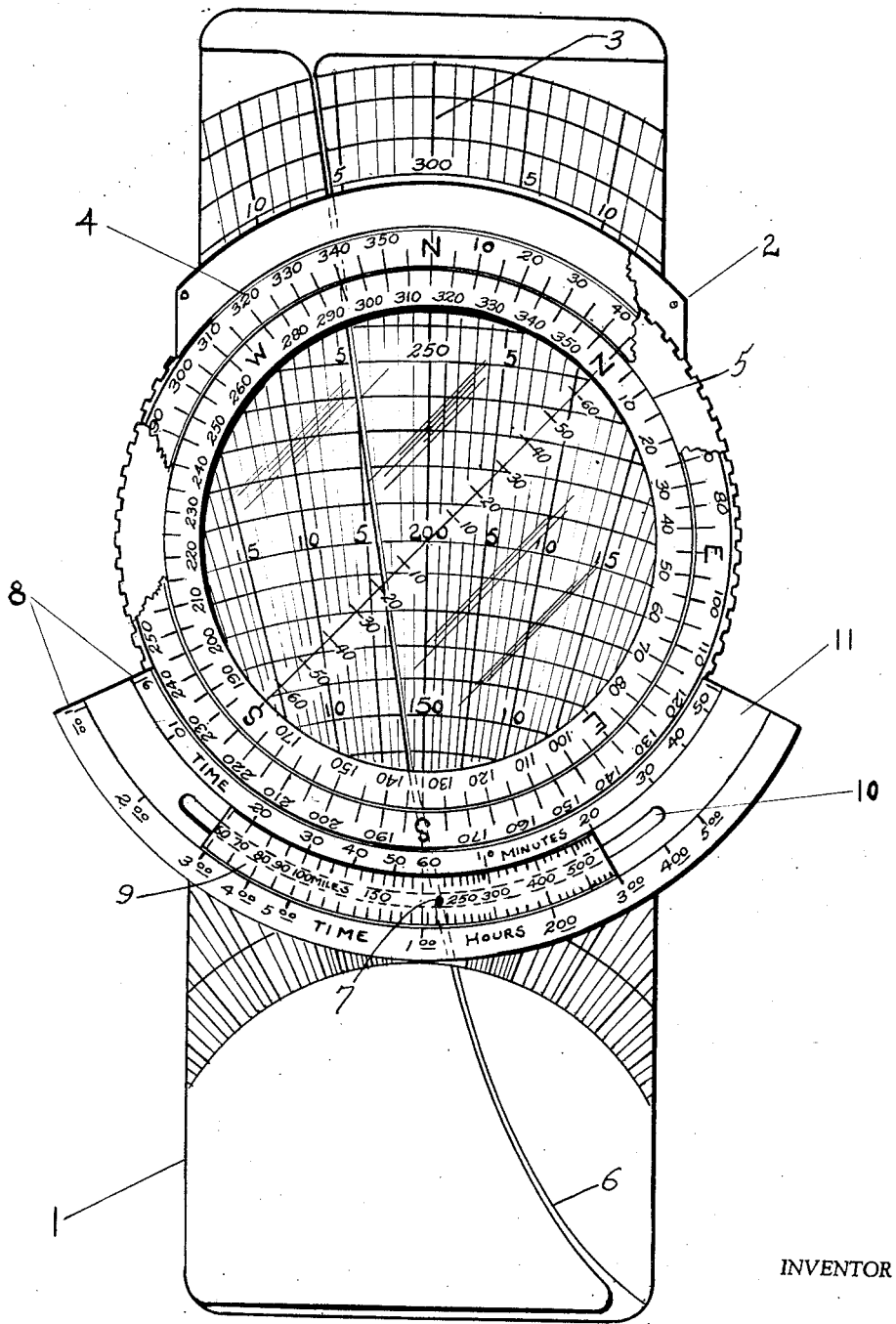
Figure 1 is a plan view of the device, partially broken away.
Figure 2:
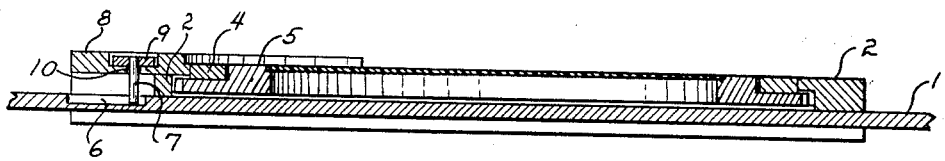
Figure 2 is a side elevation, partly in section.
Figure 3:
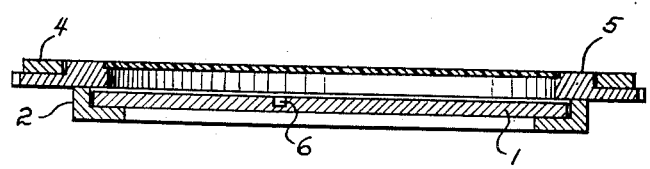
Figure 3 is an end elevation, also partly in section.

In the preferred embodiment, the computer has a slide 1, preferably of thin sheet metal, plastic, or other rigid light weight material. A section of a system of polar coordinate lines are inscribed or imprinted upon the face of the slide. The concentric circular arcs of the polar coordinates represent values of air speed and ground speed with the numerical values thereof increasing with distance from the origin of the system. The radial lines are in terms of compass degrees of drift either right or left of a center line 3. The center line 3 is used for representing either course or heading.

Slide 1 is slidably mounted within a frame 2 for rectilinear movement with respect thereto parallel to center line 3. An annular compass rose ring 4 graduated from 0° to 360° is fixedly secured to the frame 2 and the graduation represents wind direction. An annular rotatable compass rose ring 5, also graduated from 0° to 360°, is concentrically mounted with respect to the fixed compass rose ring 4 and the bearing for ring 5 is provided by the inner circumference of stationary ring 4. The indicia markings of the two rings extend to the adjoining edges thereof. The outer periphery of rotatable ring 5, which extends beyond the outer periphery of ring 4, may be knurled to facilitate rotation by hand. The degrees graduations on the rotatable ring may represent either true course or true heading, whichever is known in the problem to be solved.

The ring 5 is preferably provided with a transparent window upon which is inscribed or imprinted a graduated scale representing wind velocity in knots. The scale originates at the center of the rotatable ring, known as the grommet, and extends radially outward in opposite directions to the periphery of the window. The scale from the center to point N on compass rose 5 may be printed in black and from the center to point S may be printed in red, for representing wind vectors heading either toward or away from the grommet.

A slide rule 11 is provided for calculating time-distance relationships. The slide rule consists of an arcuate base 8 fixedly secured to the frame 2 and an arcuate member 9 slidably movable within the base. The slidable member and slide rule base have slide rule scales thereon representing distance and time respectively.

The face of slide 1 has a longitudinally extending curved groove 6 with a curvature determined by a logarithmic function. The purpose of this groove will appear hereinafter. The groove 6 is of sufficient size to receive in slidable relationship a pin 7 which is fixedly secured to the slide rule slidable member 9. The slide rule base 8 has an arcuate slot 10 cut therein. Pin 7 which is fixed to slidable member 9, extends downwardly to engage the edge of the slot 10 as it slides in groove 6. The slide rule base and member may be enclosed by a translucent window which is secured to the upper face of the slide rule base by any suitable means.

As slide 1 is moved linearly with respect to frame 2, slidable member 9 will be moved within slide rule base 8. Since the curvature of groove 6 is a logarithmic function of the equation, speed×time equals distance, the curved concentric lines representing speed inscribed on the face of slide 1 are related to the scales inscribed on slide rule 11. The relationship is such that when the grommet or center of the rotatable compass rose is indexed over a speed circle on the slide 1, the slidable member 9 is automatically positioned in slide rule base 8 so that the same value of distance as the speed will be positioned opposite a unit of time. As illustrated in Figure 1, a speed of 200 knots under the grommet corresponds to a setting of 200 miles on the scale on slidable member 9 opposite the time one hour, or sixty minutes, on slide rule base 8.

In operation and in solving problems, the following general rules are applicable: Use the center line 3 to represent either the course-ground speed or heading-air speed vector, whichever is given. If center line 3 is used for the course-ground speed vector, measure wind velocity on the black radial scale extending from the grommet to N on compass rose 5. If center line 3 is used for the heading-air speed vector, measure wind velocity on the red radial scale extending from the grommet to S on compass rose 5. Use the arcs of the polar coordinates to measure speed; read ground speed as the length of the course-ground speed vector and air speed as the length of the heading-air speed vector. Use the fixed compass ring 4 to represent wind direction, and set the rotatable compass ring 5 representing either direction of the course-ground speed vector or heading-air speed vector, whichever is given, opposite the wind direction. In all of the wind triangle problems the tail of the course-ground speed vector and the heading-air speed vector is always theoretically positioned at the origin of the polar coordinates.

The solution of various specific navigational problems with the improved computer is best shown by the following examples:

*Example I.—See Fig. 1*

Given: true course 205°; true air speed 222 knots; wind vector 250°/30 knots.

Find: true heading, ground speed, and time required to fly 400 nautical miles.

(a) Set true course 205°, on inside scale 5 against wind direction 250° on outside scale 4.

(b) Move slide to set wind force 30 knots on black wind velocity scale over true air speed circle of 222 knots.

(c) Read: (1) ground speed 200 knots under grommet; (2) drift correction +5½° under wind force on radial drift lines. Course 205° plus 5½° drift correction gives true heading of 210½°; (3) time v. distance is automatically set on slide rule, opposite 400 on scale 9, read two hours or 120 minutes on scale 8.

In Example I the direction of the course-ground speed vector, and length of the heading-air speed vector are known, as well as the length and direction of the wind vector. In the solution of the problem the course-ground speed vector is theoretically laid out along center line 3 with the tail of the vector at the origin of the polar coordinate system. The wind vector, which is carried by the scale on the window, is positioned angularly by setting the true course on compass rose 5 opposite the wind direction on compass rose 4. The tail of the wind vector will complete the triangle by connecting with the true heading vector at the air speed of 222 knots. Therefore, when the length of the wind vector, 30 knots, on the black wind velocity scale intersects the air speed circle of 222 knots, the wind triangle is completed. The grommet represents the head of the true course vector where it intersects the wind vector. Therefore, the speed circle under the grommet will represent the length of the course-ground speed vector or the value of ground speed. The drift angle is the angle between the true course and true heading vectors and this may be read directly on the radial lines. The time and distance measurements may be read directly because of the automatic positioning of the time and distance slide rule with respect to the speed under the grommet which in this example is the ground speed.

*Example II*

Given: true course 220°; ground speed 155 knots; wind vector 275°/14 knots.

Find: true heading and true air speed.

(a) Set true course 220° on inside scale 5 against wind direction 275° on the outside scale 4.

(b) Set grommet to ground speed circle, 155 knots.

(c) Read: true air speed, 164 knots, and drift correction +4° under black wind force scale at 14 on the scale. Course 220° plus 4° correction gives true heading or 224°.

In this problem the direction and length of the course-ground speed vector are known, as are the direction and length of the wind vector. The course-ground speed side of the wind triangle is theoretically positioned along center line 3 again with its tail at the origin of the polar coordinates. The wind vector is angularly positioned by setting the true course on compass rose 5 opposite wind direction on compass rose 4. The head of the wind vector or grommet is positioned at the head of the course-ground speed vector over the ground speed circle of 155 knots. The length of the wind vector is known. Therefore, the speed circle lying under the wind force scale of 14 knots represents the length of the heading-air speed vector or true air speed. The drift correction is read directly from the radial lines and may be added to the true course to obtain the true heading.

*Example III*

Given: true course 032°; ground speed 156 knots; true heading 020°; true air speed 143 knots.

Find: wind vector.

(a) Set grommet over ground speed, 156 knots.

(b) Place black graduated wind force scale on the intersection of the true air speed line 143 knots, and the radiating line showing −12° drift correction (032°−020°=12°)

(c) Read: (1) wind force 34 knots directly on the black scale at the intersection, (2) wind direction, 273° on the outer scale 4 against true course 032° shown on the inner scale 5.

(d) Read time v. distance on slide rule below.

In Example III the length and direction of both the course-ground speed and heading-air speed vectors are known. The tail of both vectors will be theoretically positioned at the origin of the polar coordinates. The course-ground speed vector is again theoretically positioned along center line 3. Its length will intersect the speed circle of 156 knots. Since the angle between the course-ground speed and heading-air speed vectors is also known, the heading-air speed vector is positioned 12° to the left of the true course vector, or −12°, and the length of the heading-air speed vector is represented by the air speed circle of 143 knots. By rotating the wind vector scale with its head at the grommet (black scale) until the scale intersects the head of the true heading vector, thereby solving the wind side of the triangle, the wind force and wind direction can be directly from the scales.

Example IV

Given: true heading 126°; true air speed 156 knots; wind vector 070°/30 knots.

Find: true course and ground speed.

(a) Set true heading 126° on inside scale 5 against wind direction 070° on outside scale 4.

(b) Set the grommet on true air speed circle 156 knots.

(c) Read: drift +10°, true course 136°

$$(126° + 10° = 136°)$$

and ground speed 142 knots under wind force of 30 on red scale.

(d) Move grommet to ground speed circle of 142 knots to read time v. distance on slide rule below.

In this problem the length and direction of the true heading and wind speed vectors are known. The heading-air speed vector is laid out on vertical line 3 with the grommet or head of the vector set at the speed circle of 156 knots. The wind vector is positioned by setting the true heading on compass rose 5 against the wind direction on compass rose 4. Since the wind vector is heading away from the heading-air speed vector, the wind force is read on the red scale. At the wind force of 30 knots or the head of the wind vector, the ground speed may be read and the drift is determined from direct readings. To make the time and distance computations, the grommet must be then positioned over the ground speed circle.

It can be readily seen in solving the foregoing problems that all the solutions may be read directly from the computer scales after one setting of the slide 1 and the movable compass rose 5 and no marking or plotting is done on the face of the computer. Time and distance problems may also be solved by merely reading the scales on slide rule 11.

Only a preferred embodiment has been shown and many changes or modifications will be apparent to those skilled in the art. For example, the slide 1 could have different scales and grooves 6 on both sides so that the slide could be reversed to give an additional scale for solving problems involving higher or lower speeds than shown on the other scale; the slide rule 11 could be either curved or straight and could be operated either horizontally or vertically on the face or back of the computer with interconnections to the movable slide; the wind vector scale could be contained on a wire stretched across the center of compass rose ring 5 thereby eliminating the translucent window.

From the foregoing, it will be apparent to those skilled in the art that there is herein shown and described a new and useful navigational computer. While a preferred embodiment is shown in the drawing and described in the specification, applicant is entitled to the benefit of a full range of equivalents within the scope of the appended claims.

I claim:

1. In a navigational computer of the type having a frame, a slide with polar coordinate lines thereon slidably mounted in said frame for movement toward and away from the origin of said polar coordinate lines, and a transparent compass rose rotatably mounted in said frame, a device for solving time and distance problems comprising: means defining a curved groove in said slide, said curvature being determined by a logarithmic function; means defining a slide rule base having a logarithmic scale thereon attached to said frame; a member slidably mounted in said slide rule base also having a logarithmic scale thereon; and means cooperating with said member and said groove whereby said member will be positioned in said slide rule base in relation to the position of said slide within said frame.

2. The device defined by claim 1 wherein said means include a pin secured to said slidable member and engaging within said groove to be slidable therein.

3. The navigational computer defined by claim 2 wherein said slide rule base and said slidable member are arcuate and are attached to said frame adjacent the outer periphery of said fixed compass rose.

4. A navigational dead reckoning computing device comprising: a pair of superposed members; the lower one of said members having polar coordinate lines thereon and a groove therein, said groove having a curvature determined by a logarithmic function; the top one of said members having a fixed compass rose and a rotatable compass rose concentric with said fixed compass rose; a transparent window in said rotatable compass rose; said window having a velocity scale extending from the center radially in opposite directions toward the periphery of said window; an arcuate scale representing time integral with said fixed compass rose; an arcuate member having a scale representing distance slidable within said arcuate scale; a pin secured to said arcuate member depending into said logarithmic groove in said lower member to be slidable therein; and means for mounting said top and lower members for relative translatory movement with respect to each other thereby permitting the distance between the center of said transparent window and the origin of said polar coordinate lines to be varied, whereby relationships between speed, direction, wind velocity, drift, time and distance may be computed as the upper and lower members are translated with respect to each other, and said compass roses are rotated with respect to each other.

5. In a navigational computer comprising a frame, a slide having polar coordinates for representing speed and drift thereon slidably mounted in said frame for movements toward and away from the origin of said polar coordinates, a compass rose rotatably mounted in said frame, and means whereby said polar coordinates are visible within said compass rose; a time and distance computer comprising: a slide rule base; a slidable member slidably mounted for movement with respect to said base, said member and base having scales thereon representing time and distance; and means interconnecting said slide and said slide rule slidable member whereby movement of said slide to a scale setting representing speed in the center of said compass rose will move said slidable member a scale setting representing the same speed for a unit of time.

6. A device as defined by claim 5 wherein said slide has a curved groove therein, said curvature determined by a logarithmic function; and said last named means include a pin fixed to said slide rule member and engaging said groove to be slidable therein.

7. A device as defined in claim 6 wherein said slide rule base and said slide rule slidable member are arcuate, and are rigidly attached to said frame.

8. A navigational computer for solving navigational problems of speed, drift, time, wind velocity, course, heading and the like comprising: a frame having a fixed compass rose ring representing wind direction integral therewith; an annular member having a compass rose representing course or heading thereon, said member being rotatably journaled in said ring concentric with said fixed compass rose; a transparent window in the center of said annular member having a diametral scale representing wind velocity; a slide having polar coordinate lines representing speed and drift thereon, said slide being slidably mounted in said frame for movement toward and away from the origin of said polar coordinate lines; means on said slide defining a groove having a curvature determined by a logarithmic function; an arcuate slide rule base having a logarithmic scale representing time thereon attached to said frame adjacent the outer periphery of said fixed compass rose, means in said base forming an arcuate way having an arcuate slot in the bottom thereof;

an arcuate member having a logarithmic scale representing distance thereon slidably mounted in said way; and a pin secured to the bottom of said member depending through said arcuate slot into engagement with said logarithmic groove to be slidable therein, whereby movement of said slide to a speed setting in the center of said compass roses will move said member to the scale setting representing the same speed for a unit of time.

9. A navigational computing device comprising: a pair of superposed members; one of said members having a fixed compass rose representing wind direction and a rotatable compass rose representing true course or true heading concentric with said fixed rose; the other of said members having polar coordinate lines representing speed and drift thereon; means whereby said polar coordinate lines are visible within said compass roses; means mounting said members for relative translatory movement with respect to each other to vary the distance between the center of the compass roses and the origin of the polar coordinate lines; means defining a curved groove on said slide, the curvature of said groove being determined by logarithmic function; a slide rule base attached to said frame; a member slidably mounted within said slide rule base; and a pin secured to said member and engaging said logarithmic groove in said slide to be slidable therein, whereby translatory movement of said slide will move said member within said slide rule base; whereby relationships between speed, direction and wind velocity may be computed.

References Cited in the file of this patent

UNITED STATES PATENTS

| | | |
|---|---|---|
| 2,425,097 | Isom | Aug. 5, 1947 |
| 2,449,342 | Tardif | Sept. 14, 1948 |
| 2,622,326 | Boehm | Dec. 23, 1952 |
| 2,717,448 | Lubin | Sept. 13, 1955 |
| 2,756,929 | McGee | July 31, 1956 |